United States Patent
Susella

(10) Patent No.: US 12,335,373 B2
(45) Date of Patent: Jun. 17, 2025

(54) METHOD FOR PERFORMING CRYPTOGRAPHIC OPERATIONS IN A PROCESSING DEVICE, CORRESPONDING PROCESSING DEVICE AND COMPUTER PROGRAM PRODUCT

(71) Applicant: STMICROELECTRONICS S.r.l., Agrate Brianza (IT)

(72) Inventor: Ruggero Susella, Milan (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 330 days.

(21) Appl. No.: 17/839,109

(22) Filed: Jun. 13, 2022

(65) Prior Publication Data

US 2022/0417012 A1 Dec. 29, 2022

(30) Foreign Application Priority Data

Jun. 28, 2021 (IT) .................. 102021000016910

(51) Int. Cl.
*H04L 9/08* (2006.01)
*H04L 9/06* (2006.01)
*H04L 9/14* (2006.01)

(52) U.S. Cl.
CPC .......... *H04L 9/0825* (2013.01); *H04L 9/0631* (2013.01); *H04L 9/0861* (2013.01); *H04L 9/14* (2013.01)

(58) Field of Classification Search
CPC ... H04L 9/0825; H04L 9/0631; H04L 9/0861; H04L 9/14
See application file for complete search history.

(56) References Cited

U.S. PATENT DOCUMENTS

2009/0214026 A1 8/2009 Gueron et al.
2010/0150344 A1* 6/2010 Karroumi ............. H04L 9/0637
380/45

(Continued)

FOREIGN PATENT DOCUMENTS

WO WO-2021252294 A1 * 12/2021 ........... G06F 17/142

OTHER PUBLICATIONS

"Syed Jahanzer Hussain Pirzada", "Abid Murtaza", "Tongge Xu", "Liu Jianwei", "Architectural Optimization of Parallel, Authenticated Encryption Algorithm for Satellite Application" (Year: 2020).*

(Continued)

*Primary Examiner* — Darshan I Dhruv
(74) *Attorney, Agent, or Firm* — Seed IP Law Group LLP

(57) ABSTRACT

Encryption of data using a cryptographic device is protected. The protecting includes generating a first output of a first branch by encrypting a constant using a key, and generating a first output of a second branch by encrypting a constant using a key. The first output of the first branch, the first output of the second branch, and a first portion of plaintext data are XORed, generating a first portion of cypher text. A second output of the first branch is generated by encrypting the first output of the first branch using a key, and a second output of the second branch is generated by encrypting the first output of the second branch using a key. The second output of the first branch, the second output of the second branch, and a second portion of plaintext data are XORed, generating a second portion of cypher text.

21 Claims, 2 Drawing Sheets

(56) References Cited

U.S. PATENT DOCUMENTS

| | | | | |
|---|---|---|---|---|
| 2016/0072779 A1* | 3/2016 | Medwed | ............... | H04L 9/0618 |
| | | | | 713/171 |
| 2016/0156461 A1* | 6/2016 | Avanzi | ................. | H04L 9/0618 |
| | | | | 380/28 |
| 2016/0323097 A1* | 11/2016 | Medwed | ............... | H04L 9/0891 |
| 2018/0183576 A1* | 6/2018 | Wang | ................... | H04L 9/0631 |

OTHER PUBLICATIONS

"Pirzada et al.", "Architectural Optimization of Parallel Authenticated Encryption Algorithm for Satellite Application", vol. 8, 2020 (Year: 2020).*

Berti et al., "Leakage-Resilient and Misuse-Resistant Authenticated Encryption," IACR Cryptology ePrint Archive, Paper 2016/996, 29 pages.

Dobraunig et al., "ISAP—Towards Side-Channel Secure Authenticated Encryption," *IACR Transactions on Symmetric Cryptology* 2017(1):80-105.

Goldreich et al., "How to Construct Random Functions," *Journal of the Association for Computing Machinery* 33(4):792-807, Oct. 1986.

Medwed et al., "Towards Super-Exponential Side-Channel Security with Efficient Leakage-Resilient PRFs," In: Prouff et al. (eds.) *Cryptographic Hardware and Embedded Systems*, CHES 2012—14th International Workshop, Leuven, Belgium, Sep. 9-12, 2012, Lecture Notes in Computer Science, vol. 7428, pp. 193-212, Springer, 2012.

Pirzada et al., "Architectural Optimization of Parallel Authenticated Encryption Algorithm for Satellite Application," *IEEE Access* 8:48543-48556, Mar. 5, 2020.

* cited by examiner

METHOD FOR PERFORMING CRYPTOGRAPHIC OPERATIONS IN A PROCESSING DEVICE, CORRESPONDING PROCESSING DEVICE AND COMPUTER PROGRAM PRODUCT

BACKGROUND

Technical Field

The present description relates to techniques for performing cryptographic operations on data in a processing device comprising an encryption procedure.

Various embodiments may apply, e.g., to smartcard, microcontrollers, Internet of Things chips, set-top-box using an encryption or digital signature scheme.

Description of the Related Art

Cryptographic protocols are abstract or concrete protocols that perform a security-related function and apply cryptographic methods, often as sequences of cryptographic primitives.

In the field of protection from Side Channel Attacks in devices which uses cryptographic algorithms, e.g., microcontroller implementing encryption algorithms, such as ECC or RSA, vertical Side Channel Attacks (SCA) are known, where the attacker can encrypt arbitrary data (input) using the device, in order to get the cryptographic key used by the encryption algorithm. The attackers record side channel information during encryption of known input data, the side channel being represented by power consumption, electromagnetic radiation, or other similar quantities.

The side channel is linked with the data processed by the device, which are the cryptographic key and the attacker's data fed as input, which represent therefore known data.

The attacker records many "traces" with different known input data and a constant unknown key, making hypotheses on the value of a portion of the cryptographic key, and uses statistical methods to verify such hypotheses using the traces. To apply such statistical methods the attacker needs to use many traces, each with different and known input data and constant key.

A known solution to defend from such attacks is to use an implementation with SCA protection, which however cannot make use of existing non-protected hardware, while it is often too late or too costly to embed protected hardware. Also it is not always possible to switch to protected software implementation, because of anti-reverse engineering constraints, as protected software must not be visible to attackers. Also protected software requires secret random (secret even for legitimate user). Finally there may be a significant downgrade of the performance.

On the other hand it is possible to define an operation that is leakage resilient (DPA resistant) on top of existing hardware.

Therefore, in Leakage Resilient encryption schemes it is provided to derive a different key for each message from the same master key. This requires a Key Derivation Function, or KDF, which uses multiple times the master key. Thus, the KDF itself must be leakage resilient, e.g., a Leakage Resilient Key Derivation Function (LR-KDF).

Thus LR-KDF implemented on commonly available unprotected crypto hardware accelerators may represent an attractive solution if one cannot afford DPA protected solutions and/or wants to leverage existing hardware.

With current Leakage Resilient techniques however, either sometimes it cannot exploit current unprotected hardware, such as in the technique called ISAP, which uses Sponges and not AES, as described for instance in Dobraunig, Eichlseder, Mangard, Mendel, Unterluggauer, *"ISAP—Towards Side-Channel Secure Authenticated Encryption,"* or such techniques are not optimized to achieve good performance, as the technique described in Berti, Koeune, Pereira, Peters, Standaert, *"Leakage-Resilient and Misuse-Resistant Authenticated Encryption"* where the encryption key is changed after two encryptions, resulting in a time consuming implementation, although operating on existing hardware.

BRIEF SUMMARY

In an embodiment, a method comprises: executing cryptographic operations on data using cryptographic circuitry; and protecting, using the cryptographic circuitry, the cryptographic operations during the executing. The executing and protecting includes: generating an initialization vector; generating, using the initialization vector and a secret key, one or more unique keys; encrypting, using a first branch of the cryptographic circuitry, a constant associated with the first branch, using, as an encryption key, a key of the one or more unique keys that is associated with the first branch, generating a first output of the first branch; encrypting, using a second branch of the cryptographic circuitry, a constant associated with the second branch, using, as an encryption key, a key of the one or more unique keys that is associated with the second branch, generating a first output of the second branch; XORing the first output of the first branch, the first output of the second branch, and a first portion of plaintext data, generating a first portion of cypher text; encrypting, using the first branch of the cryptographic circuitry, the first output of the first branch, using, as an encryption key, the key of the one or more unique keys that is associated with the first branch, generating a second output of the first branch; encrypting, using the second branch of the cryptographic circuitry, the first output of the second branch, using, as an encryption key, the key of the one or more unique keys that is associated with the second branch, generating a second output of the second branch; and XORing the second output of the first branch, the second output of the second branch and a second portion of plaintext data, generating a second portion of cypher text.

In an embodiment, a cryptographic device comprises: a first encryption branch comprising a plurality of cryptographic circuits coupled together in series; a second encryption branch comprising a plurality of cryptographic circuits coupled together in series; and XOR circuitry coupled to the first encryption branch and to the second encryption branch, wherein, the cryptographic device, in operation, executes cryptographic operations on data and protects the cryptographic operations during the executing. The executing and protecting includes: encrypting, using the first branch of the cryptographic circuitry and an encryption key associated with the first branch, a constant associated with the first branch, generating a first output of the first branch; encrypting, using the second branch of the cryptographic circuitry and an encryption key associated with the second branch, a constant associated with the second branch, generating a first output of the second branch; XORing, using the XOR circuitry, the first output of the first branch, the first output of the second branch, and a first portion of plaintext data, generating a first portion of cypher text; encrypting, using the first branch of the cryptographic circuitry and the encryption key associated with the first branch, the first output of the first branch, generating a second output of the first branch; encrypting, using the second branch of the cryptographic circuitry and the encryption key associated with the second branch, the first output of the second branch, generating a second output of the second branch; and XORing, using the XOR circuitry, the second output of the first branch, the second output of the second branch, and a second portion of plaintext data, generating a second portion of cypher text.

In an embodiment, a system comprises: processing circuitry; and memory coupled to the processing circuitry, wherein the processing circuitry, in operation: encrypts, using an encryption key associated with a first encryption branch, a constant associated with the first encryption branch, generating a first output of the first encryption branch; encrypts, using an encryption key associated with a second encryption branch, a constant associated with the second encryption branch, generating a first output of the second encryption branch; XORs the first output of the first encryption branch, the first output of the second encryption branch, and a first portion of plaintext data, generating a first portion of cypher text; encrypts, using the encryption key associated with the first encryption branch, the first output of the first encryption branch, generating a second output of the first encryption branch; encrypts, using the encryption key associated with the second encryption branch, the first output of the second encryption branch, generating a second output of the second encryption branch; and XORs the second output of the first encryption branch, the second output of the second encryption branch, and a second portion of plaintext data, generating a second portion of cypher text.

In an embodiment, a non-transitory computer-readable medium's contents cause cryptographic circuitry to perform a method, the method comprising: executing cryptographic operations on data; and protecting the cryptographic operations during the executing, the executing and protecting including: generating an initialization vector; generating, using the initialization vector and a secret key, one or more unique keys; encrypting, using a first branch of the cryptographic circuitry, a constant associated with the first branch, using, as an encryption key, a key of the one or more unique keys that is associated with the first branch, generating a first output of the first branch; encrypting, using a second branch of the cryptographic circuitry, a constant associated with the second branch, using, as an encryption key, a key of the one or more unique keys that is associated with the second branch, generating a first output of the second branch; XORing the first output of the first branch, the first output of the second branch, and a first portion of plaintext data, generating a first portion of cypher text; encrypting, using the first branch of the cryptographic circuitry, the first output of the first branch, using, as an encryption key, the key of the one or more unique keys that is associated with the first branch, generating a second output of the first branch; encrypting, using the second branch of the cryptographic circuitry, the first output of the second branch, using, as an encryption key, the key of the one or more unique keys that is associated with the second branch, generating a second output of the second branch; and XORing the second output of the first branch, the second output of the second branch and a second portion of plaintext data, generating a second portion of cypher text.

BRIEF DESCRIPTION OF THE SEVERAL VIEWS OF THE DRAWINGS

The disclosure will now be described purely by way of a non-limiting example with reference to the annexed drawings, in which.

DETAILED DESCRIPTION

The ensuing description illustrates various specific details aimed at an in-depth understanding of the embodiments. The embodiments may be implemented without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is meant to indicate that a particular configuration, structure, or characteristic described in relation to the embodiment is comprised in at least one embodiment. Likewise, phrases such as "in an embodiment" or "in one embodiment," that may be present in various points of the present description, do not necessarily refer to the one and the same embodiment. Furthermore, particular conformations, structures, or characteristics can be combined appropriately in one or more embodiments.

The references used herein are intended merely for convenience and hence do not define the sphere of protection or the scope of the embodiments.

The solution here described refers to a method of for performing cryptographic operations on data in a processing device comprising a Leakage resilient encryption procedure, which comprises a Leakage Resilient key derivation function which derives a different key for each message from the same master key, which makes use of a double Output FeedBack.

Figure 1:
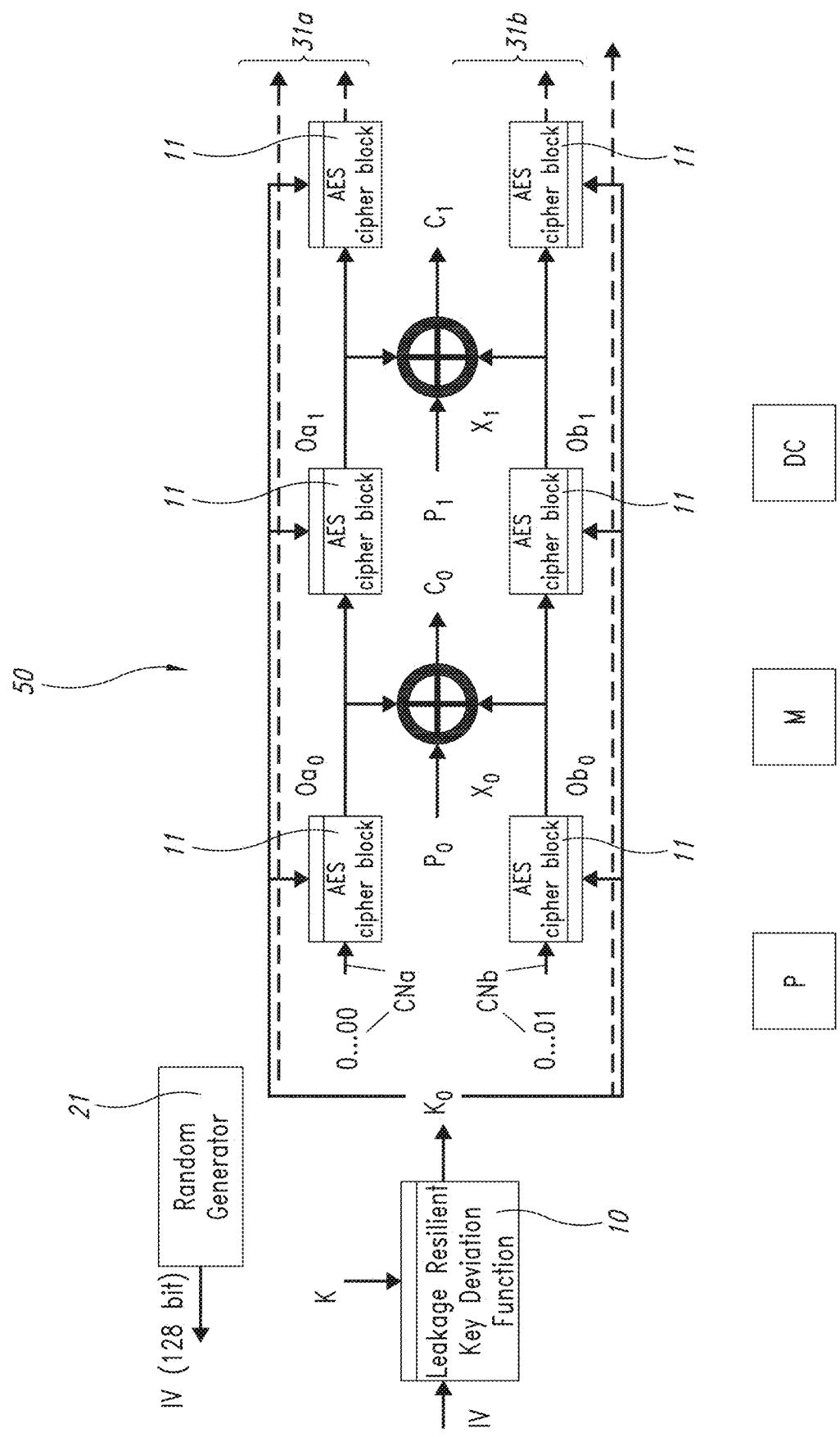
FIG. 1 represent a block scheme of an embodiment of processing device implementing the method here described.

As shown in FIG. 1, a system for encryption 50 includes a random number generator 21 generating an initialization vector IV, having in the example here discussed 128 bits. Such binary sequence IV is fed to a Leakage Resilient Key Derivation Function, or LR-KDF, generator 10 together with a master encryption key MK to obtain a derived key $K_0$.

It is underlined that according to the solution here described, the initialization vector IV is a not repeating, in particular random, binary sequence, which is generated by an initialization vector generator. In an embodiment, the initialization vector IV is a random vector generated by a random generator as in the example, however it can be for instance generated by a monotonic counter, which generates increasing, thus not repeating, numbers.

The derived key $K_0$ is fed to two branches 31a and 31b in parallel, each branch comprising a plurality of invocations of AES cipher, represented by blocks 11, in series. Such derived key $K_0$ is fed as encryption key while to the first AES cipher 11 in the first branch 31a is fed as input a first constant CNa, in the example 0 . . . 000, while to the first AES operation of the second branch 31b is fed a second constant CNb, in the example 0 . . . 001, different from said first constant CNa.

The outputs $Oa_0$, $Ob_0$ of the first AES cipher 11, constant CNa, CNb AES encrypted with the derived key $K_0$, in the first and second branch 31a, 31b are brought to a first XOR block $X_0$ performing a XOR operation between them and a first portion $P_0$, having a given length, of a plaintext P. In particular the first portion $P_0$ is a portion of 128 bits of length. The output of the first XOR block $X_0$ is a first portion $C_0$ of a ciphertext C. Therefore, the outputs of the first invocation of the AES cipher 11 represent a keystream which is supplied to the first XOR block $X_0$ to encode the first portion $P_0$ of plaintext obtaining the first portion $C_0$ of a ciphertext C.

It is noted that the first XOR block $X_0$ is a three input XOR, which, as known, performs first a XOR on two on the inputs producing a result and then performs the XOR of such result with the third input.

Therefore, in particular, said having the outputs $Oa_0$, $Ob_0$ of the first encryption operations on each encryption branch $31a$, $31b$ and a first portion $P_0$ of a plaintext being the inputs of a first XOR function $X_0$ producing a first portion of cipher text $C_0$. In an embodiment, the first XOR function $X_0$ is implemented by first performing a XOR operation between the outputs $Oa_0$, $Ob_0$ of the first encryption operations on each encryption branch $31a$, $31b$, then the result of such first XOR operation is XOR-ed with the first portion $P_0$ of the plaintext. This avoids that an attacker can, during a decryption, ask decryption of the same message more times.

This implementation may be used also in the subsequent XOR functions, e.g., $X_1$, . . . , to produce subsequent portions of cipher text, e.g., $C_1$, as described in the following description.

The outputs $Oa_0$, $Ob_0$ are then also supplied to a subsequent, in particular second, respective invocation of the AES cipher 11 together with the derived key $K_0$. Second outputs $Oa_1$, $Ob_1$ of the second AES cipher 11 in the first and second branch $31a$, $31b$ are brought to a second XOR block $X_1$ performing a XOR operation between them and a second portion $P_1$, of such given length, of such a plaintext P. The output of the second XOR block $X_1$ is a second portion C1 of the ciphertext C. Therefore, the outputs of the subsequent invocation of the AES cipher 11 represent a keystream which is supplied to the second XOR block $X_1$ to encode the second portion $P_1$ of plaintext obtaining the second portion $C_0$ of a ciphertext C.

Thus, summing up, on each branch a chain of cipher blocks 11, or better invocation of ciphers, in particular AES, is provided, which output is provided as keystream to a XOR which encodes a portion of the plaintext in a portion of ciphertext. The first block of the chain is initiated with a constant, instead that with the output of the previous block.

It can be recognized that each of the branches $31a$ and $31b$ basically correspond to an OFB encryption, since each block cipher operation, depends on all previous ones, and so is not performed in parallel.

Thus, the circuit of FIG. 1 is configured as a double OFB encryption, as the XOR operation is carried out on both the outputs of the OFB branches $31a$ and $31b$ and the portion of plaintext. As mentioned, blocks 11 represents an invocation of cipher block encryption in general, in the example AES encryption. This means that there can be a unique cipher block encryption module, e.g., a unique AES module, which performs sequentially all the cipher block encryptions 11, for example, an invocation to the cipher block encryptions 11 is performed each time.

Thus, summing up, with reference to FIG. 1 a method is described to perform cryptographic operations on data in a processing device comprising a Leakage resilient encryption procedure, which comprises a Leakage Resilient key derivation function which derives a different key for each message from the same master key, said method comprising generating a not repeating, in particular random, initialization vector IV by an initialization vector generator, in particular random generator 21, performing a Leakage Resilient key derivation function using a master encryption key MK and such initialization vector IV as inputs of a key derivation function chain 10, obtaining at least a derivation key $K_0$. Also two different key $K_0$,$K_1$ can be obtained, one for each branch $31a$, $31b$.

Then it is provided supplying said at least a derivation key, e.g., $K_0$ as encryption key to a pair of output feedback encryption branches $31a$, $31b$. Said encryption branches include each a chain of cipher blocks 11, or invocation to a same cipher block, e.g., AES, which receive the derivation key as encryption key. The output of each cipher 11 having the same position in the chain in each branch is brought as input of a XOR together with a portion of ciphertext.

Each encryption branch $31a$, $31b$ performs therefore a first encryption operation invoking the cipher block encryption 11 using such at least a derivation key $K_0$ as encryption key and receiving a respective first constant CNa and second constant CNb as input to be encrypted, the outputs $Oa_0$, $Ob_0$ of the first encryption operations on each encryption branch $31a$, $31b$ and a first portion $P_0$ of a plaintext being the inputs of a first XOR function $X_0$ producing a first portion of cipher text $C_0$.

For the cipher blocks 11 subsequent with respect to the first block, which number, the number of invocations, depends on the length of the message to be encrypted, e.g., cipher text, it is then provided performing at least one subsequent encryption invoking a cipher block encryption 11 using said at least a key $K_0$ as encryption key and receiving the outputs $Oa_0$, $Ob_0$ of the previous encryptions as input to be encrypted, the outputs $Oa_1$, $Ob_1$ of said subsequent encryptions and a subsequent portion $P_1$ of a plaintext being the inputs of a subsequent XOR function $X_1$ producing a subsequent portion of cipher text $C_1$.

The LR-KDF generator 10 can be implemented by different KDF procedures or algorithms.

The basic requirement of Leakage Resilient encryption is that a key can be used for a very limited number of times. However users may desire to have a master key which lasts a long time, for example, for years.

Therefore in Leakage Resilient encryption schemes it is provided to derive a different key for each message from the same master key. This requires a Key Derivation Function, or KDF, which uses multiple times the master key. Thus, the KDF itself is leakage resilient, a Leakage Resilient Key Derivation Function (LR-KDF).

Solutions are known which makes use of a Leakage Resilient cryptography such as the so called GGM scheme, described in Oded Goldreich, Shafi Goldwasser, and Silvio Micali. *"How to construct random functions"* Journal of the ACM, 33(4): 792-807, October 1986.

As illustrated, the system 50 of FIG. 1 includes one or more processors P, one or more memories M, and discrete circuitry DC, which may be employed in various combinations to implement the functionality of the system 50. Such functionality may include the encrypting and protection operations described herein, as well as other functional operations of the system 50, such as operations associated with smartcards, microcontrollers, Internet of Things chips, set-top-boxes, etc., using an encryption or digital signature scheme. To this regard, in FIG. 2 it is shown a chain to obtain a derived key from a master key, which may be the LR-KDF generator 10. A master key MK is supplied to an invocation of a cipher 11, e.g., a cipher performing AES (Advanced Encryption Standard) encryption, block 11 which receives the first bit $NC_0$ of a nonce NC, e.g., a number, such as a random number, used only once, which can be seen as a plaintext to be encrypted by the AES 11. The output of the encryption, $IK_0$, is used as key for another invocation of the AES cipher 11 together with the following bit $NC_1$ of the nonce NC.

The procedure is repeated to the last n-th bit $NC_n$ of the nonce NC, which gives an encrypted output $IK_n$. Then a final encryption is performed on the n-th encrypted output $IK_n$ supplying a string of zeroes as plaintext instead of the nonce NC bits, to the invocation of AES cipher 11, obtaining finally as output the derived key DK.

Again blocks 11 represent cipher block encryption in general, in the example AES encryption and the unique cipher block encryption module, e.g., unique AES module, can perform sequentially also the cipher block encryptions 11 of the LR-KDF generator 10. It is noted that by the solution described in FIG. 1 the initialization vector IV is randomly generated internally at the encryption system 50, and not passed from outside. Random generation with respect to using the monotonic counter avoids the necessity of saving the monotonic counter value and avoiding its modification. As mentioned, the initialization vector IV does not repeat. In an embodiment, the initialization vector IV is a nonce.

Thus, the random internally generated initialization vector IV is input to LR-KDF generator 10 to generate the derived key $K_0$ which is the derived key used to generate 2 OFB streams. As the derived key $K_0$ is not known, under the LR-KDF assumptions, an attacker would not know the input values to the AES 11 in the AES-OFB, except for the first constant, e.g., 0 . . . 00, and second constant 0 . . . 01. Knowledge of plaintext P and ciphertext C does not allow attacker to recover the input values to the AES blocks 11.

In variant embodiments, two different derived keys can be generated by a same LR-DF generator or two LR-KDF generators, keys $K_0$, $K_1$ respectively, and supplied to the respective OFB branches 31a, 31b. In that case, the first constant CNa and the second constant CNb may or may not be different.

Figure 2:
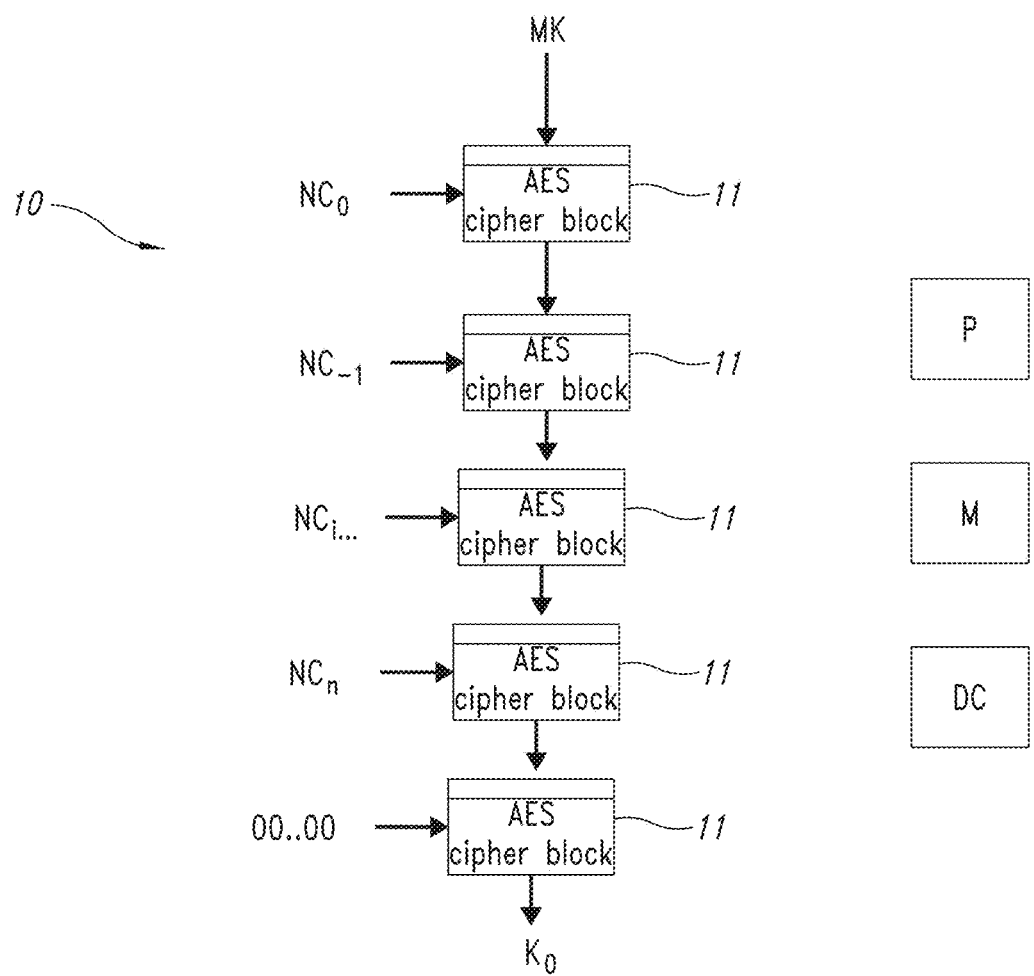
FIG. 2 represents a detail of a possible embodiment of a block of FIG. 1.

As illustrated, the key generator 10 of FIG. 2 includes one or more processors P, one or more memories M, and discrete circuitry DC, which may be employed in various combinations to implement the functionality of the key generator 10.

An authentication module, not shown in FIG. 1, may be arranged downstream the branches 31a and 31b. This authentication module may be implemented for instance according to authentication schemes described in Berti, Koeune, Pereira, Peters, Standaert, "Leakage-Resilient and Misuse-Resistant Authenticated Encryption," Published 2016, Computer Science, IACR Cryptol., or Medwed, Standaert, Joux, *"Towards Super-Exponential Side-Channel Security with Efficient Leakage-Resilient PRFs,"* in Prouff, E., Schaumont, P. (eds.) Cryptographic Hardware and Embedded Systems—CHES 2012—14th International Workshop, Leuven, Belgium, Sep. 9-12, 2012. Proceedings. Lecture Notes in Computer Science, vol. 7428, pp. 193-212. Springer (2012).

In variant embodiments, the solution here described may be applied not only to a Leakage resilient encryption procedure, which comprises a Leakage Resilient key derivation function which derives a different key for each message from the same master key, but also to an encryption procedure in which at least a unique key is supplied to the OFB structure. Therefore, the solution in general refers to a method for performing cryptographic operations on data in a processing device comprising an encryption procedure,
said method comprising
generating an initialization vector IV not repeating by unique key generator,
obtaining at least a unique key,
supplying said at least a unique key as encryption key to a pair of output feedback encryption branches,
each encryption branch performing a first encryption operation invoking an encryption block cipher performing an encryption operation using said at least a unique key as encryption key and receiving a respective first and second constant as input to be encrypted,
the outputs of said first encryption operations on each encryption branch and a first portion of a plaintext being the inputs of a first XOR function producing a first portion of cipher text,
performing at least one subsequent encryption invoking an encryption block cipher using said at least a unique key as encryption key and receiving the outputs of the previous encryptions as input to be encrypted, the outputs of said subsequent encryptions and a subsequent portion of a plaintext being the inputs of a subsequent XOR function producing a subsequent portion of cipher text.

The solution according to the various embodiments here described may provide the following advantages.

The solution here described facilitates a new mode of operation which is leakage resilient (DPA resistant). Such mode operates by having a first nonce-based key derivation and using the derived key or keys to generate more than one keystream without having the input, the plaintext, being processed by the cipher, but just combined with the keystream, performing an exclusive OR with the keystream, to obtain the ciphertext.

Of course, without prejudice to the principle of the embodiments, the details of construction and the embodiments may vary widely with respect to what has been described and illustrated herein purely by way of example, without thereby departing from the scope of the present embodiments, as defined the ensuing claims.

In an embodiment, a method for performing cryptographic operations on data in a processing device includes an encryption procedure, said method may be summarized as including generating a not repeating, in particular random, initialization vector (IV) by an initialization vector generator, in particular random generator (21), obtaining at least a unique key ($K_0$; $K_0, K_1$), supplying said at least a unique key ($K_0$; $K_0, K_1$) as encryption key to a pair of output feedback encryption branches (31a, 31b), each encryption branch (31a, 31b) performing a first encryption operation invoking an encryption block cipher (11) performing an encryption operation using said at least a unique key ($K_0$; $K_0, K_1$) as encryption key and receiving a respective first (CNa) and second (CNb) constant as input to be encrypted, the outputs ($Oa_0$, $Ob_0$) of said first encryption operations on each encryption branch (31a, 31b) and a first portion ($P_0$) of a plaintext being the inputs of a first XOR function ($X_0$) producing a first portion of cipher text ($C_0$), performing at least one subsequent encryption invoking an encryption block cipher (11) using said at least a unique key ($K_0$; $K_0, K_1$) as encryption key and receiving the outputs ($Oa_0$, $Ob_0$) of the previous encryptions as input to be encrypted, the outputs ($Oa_1$, $Ob_1$) of said subsequent encryptions and a subsequent portion ($P_1$) of a plaintext being the inputs of a subsequent XOR function ($X_1$) producing a subsequent portion of cipher text ($C_1$).

In an embodiment, said at least a unique key ($K_0$; $K_0, K_1$) may be a single unique key ($K_0$) and said first and second constants (CNa, CNb) may be different one with respect to the other.

In an embodiment, two unique keys ($K_0, K_1$) may be sent respectively to the first branch (31a) and to the second branch (31b) and said first and second constants (CNa, CNb) may be equal.

In an embodiment, said initialization vector (IV) may be generated as a nonce.

The method may include an authenticated encryption procedure on the cipher text obtained.

Said cipher block (11) may be an AES cipher.

In an embodiment, having the outputs ($Oa_0, Ob_0$) of the first encryption operations on each encryption branch (31a, 31b) and a first portion ($P_0$) of a plaintext being the inputs of a first XOR function ($X_0$) producing a first portion of cipher text ($C_0$) may be implemented by first performing a first XOR between the outputs ($Oa_0, Ob_0$) of the first encryption operations on each encryption branch (31a, 31b) then on the result of such first XOR operation may be performed a XOR with the first portion $P_0$ of the plaintext, producing said first portion of cipher text ($C_0$), the subsequent XOR functions ($X_1$) being also so implemented to produce subsequent portions of cipher text ($C_1$).

In an embodiment, said encryption procedure may be a Leakage resilient encryption procedure, which may include a Leakage Resilient key derivation function which derives a different key for each message from the same master key, said method including performing a Leakage Resilient key derivation function using a master encryption key (MK) and said initialization vector (IV) as inputs of a key derivation function chain (10), obtaining at least a derivation key ($K_0$; $K_0, K_1$) as said unique key ($K_0$; $K_0, K_1$).

A processing device (10) may be configured to perform the steps of the methods disclosed herein.

The processing device may include a random generator (21) for generating said random initialization vector (IV), a unique key generator (10) configured to obtain said at least a unique key ($K_0$; $K_0, K_1$), an encryption arrangement may include a pair of output feedback encryption branches (31a, 31b), each encryption branch (31a, 31b) may include a chain of invocations of an encryption block cipher (11), each output of a previous encryption block cipher being the input of the following encryption block cipher, which receives said at least a unique key ($K_0$; $K_0, K_1$) as encryption key, the first encryption block cipher (11) receiving the respective first (CNa) and second (CNb) constant as input to be encrypted, said encryption arrangement may include also a plurality of blocks ($X_0, X_1$) performing a XOR function, the output of each cipher (11) having the same position in the chain of encryption branch (31a, 31b) being fed as input to a respective XOR function ($X_0$) together with the plaintext portion to obtain a corresponding portion of cipher text ($C_0$).

Said unique key generator (10) may be configured to obtain said at least a unique key ($K_0$; $K_0, K_1$) and may be a Leakage Resilient key derivation function generator (10) configured to obtain said at least a derivation key ($K_0$; $K_0, K_1$), In an embodiment, a computer program product that can be loaded into the memory of at least one computer and may be summarized as including parts of software code that are able to execute the steps of the methods disclosed herein when the product is run on at least one computer.

In an embodiment, a method comprises: executing cryptographic operations on data using cryptographic circuitry; and protecting, using the cryptographic circuitry, the cryptographic operations during the executing. The executing and protecting includes: generating an initialization vector; generating, using the initialization vector and a secret key, one or more unique keys; encrypting, using a first branch of the cryptographic circuitry, a constant associated with the first branch, using, as an encryption key, a key of the one or more unique keys that is associated with the first branch, generating a first output of the first branch; encrypting, using a second branch of the cryptographic circuitry, a constant associated with the second branch, using, as an encryption key, a key of the one or more unique keys that is associated with the second branch, generating a first output of the second branch; XORing the first output of the first branch, the first output of the second branch, and a first portion of plaintext data, generating a first portion of cypher text; encrypting, using the first branch of the cryptographic circuitry, the first output of the first branch, using, as an encryption key, the key of the one or more unique keys that is associated with the first branch, generating a second output of the first branch; encrypting, using the second branch of the cryptographic circuitry, the first output of the second branch, using, as an encryption key, the key of the one or more unique keys that is associated with the second branch, generating a second output of the second branch; and XORing the second output of the first branch, the second output of the second branch and a second portion of plaintext data, generating a second portion of cypher text.

In an embodiment, the one or more unique keys comprise a single unique key associated with both the first branch and the second branch; and the constant associated with the first branch and the constant associated with the second branch are different constants. In an embodiment, the one or more unique keys comprise a first unique key associated with the first branch and a second, different unique key associated with the second branch; and the constant associated with the first branch and the constant associated with the second branch are equal. In an embodiment, the method comprises generating the initialization vector as a nonce. In an embodiment, the method comprises executing an authentication procedure on the first and second portions of cipher text. In an embodiment, the encrypting by the first and second branches comprises applying AES ciphering. In an embodiment, the XORing the first output of the first branch, the first output of the second branch, and the first portion of plaintext data comprises: XORing the first output of the first branch with the first output of the second branch, generating a first XOR result; and XORing the first XOR result with the first portion of plaintext data, generating the first portion of cypher text; and the XORing the second output of the first branch, the second output of the second branch, and the second portion of plaintext data comprises: XORing the second output of the first branch with the second output of the second branch, generating a second XOR result; and XORing the second XOR result with the second portion of plaintext data, generating the second portion of cypher text. In an embodiment, the generating, using the initialization vector and a secret key, the one or more unique keys comprises: performing a leakage resilient key derivation function using a master encryption key and the initialization vector (IV) as inputs to a key derivation function chain.

In an embodiment, a cryptographic device comprises: a first encryption branch comprising a plurality of cryptographic circuits coupled together in series; a second encryption branch comprising a plurality of cryptographic circuits coupled together in series; and XOR circuitry coupled to the first encryption branch and to the second encryption branch, wherein, the cryptographic device, in operation, executes cryptographic operations on data and protects the cryptographic operations during the executing. The executing and protecting includes: encrypting, using the first branch of the cryptographic circuitry and an encryption key associated with the first branch, a constant associated with the first branch, generating a first output of the first branch; encrypting, using the second branch of the cryptographic circuitry and an encryption key associated with the second branch, a constant associated with the second branch, generating a first output of the second branch; XORing, using the XOR circuitry, the first output of the first branch, the first output of the second branch, and a first portion of plaintext data, generating a first portion of cypher text; encrypting, using the first branch of the cryptographic circuitry and the encryption key associated with the first branch, the first output of the first branch, generating a second output of the first branch; encrypting, using the second branch of the cryptographic circuitry and the encryption key associated with the second branch, the first output of the second branch, generating a second output of the second branch; and XORing, using the XOR circuitry, the second output of the first branch, the second output of the second branch, and a second portion of plaintext data, generating a second portion of cypher text. In an embodiment, the encryption key associated with the first branch and the encryption key associated with the second branch are a same encryption key; and the constant associated with the first branch and the constant associated with the second branch are different constants. In an embodiment, the encryption key associated with the first branch and the encryption key associated with the second branch are different encryption keys; and the constant associated with the first branch and the constant associated with the second branch are a same constant. In an embodiment, the cryptographic device comprises a key generator coupled to the first and second encryption branches, wherein the key generator, in operation, generates one or more unique keys based on an initialization vector and a master key. In an embodiment, the key generator comprises a leakage resilient key derivation function chain having a plurality of AES circuits coupled together in series. In an embodiment, the cryptographic device comprises a random number generator, which, in operation, generates the initialization vector. In an embodiment, the cryptographic device comprises a monotonic counter, which, in operation, generates the initialization vector. In an embodiment, the cryptographic device, in operation, executes an authentication procedure on the first and second portions of cipher text. In an embodiment, the plurality of cryptographic circuits of the first cryptographic branch comprise a plurality of AES circuits coupled together in series; and the plurality of cryptographic circuits of the second cryptographic branch comprise a plurality of AES circuits coupled together in series. In an embodiment, the XOR circuitry, in operation, XORs the first output of the first branch with the first output of the second branch, generating a first XOR result; XORs the first XOR result with the first portion of plaintext data, generating the first portion of cypher text; XORs the second output of the first branch with the second output of the second branch, generating a second XOR result; and XORs the second XOR result with the second portion of plaintext data, generating the second portion of cypher text.

In an embodiment, a system comprises: processing circuitry; and memory coupled to the processing circuitry, wherein the processing circuitry, in operation: encrypts, using an encryption key associated with a first encryption branch, a constant associated with the first encryption branch, generating a first output of the first encryption branch; encrypts, using an encryption key associated with a second encryption branch, a constant associated with the second encryption branch, generating a first output of the second encryption branch; XORs the first output of the first encryption branch, the first output of the second encryption branch, and a first portion of plaintext data, generating a first portion of cypher text; encrypts, using the encryption key associated with the first encryption branch, the first output of the first encryption branch, generating a second output of the first encryption branch; encrypts, using the encryption key associated with the second encryption branch, the first output of the second encryption branch, generating a second output of the second encryption branch; and XORs the second output of the first encryption branch, the second output of the second encryption branch, and a second portion of plaintext data, generating a second portion of cypher text. In an embodiment, the encryption key associated with the first encryption branch and the encryption key associated with the second encryption branch are a same encryption key; and the constant associated with the first encryption branch and the constant associated with the second encryption branch are different constants. In an embodiment, the encryption key associated with the first branch and the encryption key associated with the second branch are different encryption keys; and the constant associated with the first branch and the constant associated with the second branch are a same constant. In an embodiment, the processing circuitry, in operation, XORs the first output of the first cryptographic branch with the first output of the second cryptographic branch, generating a first XOR result; XORs the first XOR result with the first portion of plaintext data, generating the first portion of cypher text; XORs the second output of the first cryptographic branch with the second output of the second cryptographic branch, generating a second XOR result; and XORs the second XOR result with the second portion of plaintext data, generating the second portion of cypher text.

In an embodiment, a non-transitory computer-readable medium's contents cause cryptographic circuitry to perform a method, the method comprising: executing cryptographic operations on data; and protecting the cryptographic operations during the executing, the executing and protecting including: generating an initialization vector; generating, using the initialization vector and a secret key, one or more unique keys; encrypting, using a first branch of the cryptographic circuitry, a constant associated with the first branch, using, as an encryption key, a key of the one or more unique keys that is associated with the first branch, generating a first output of the first branch; encrypting, using a second branch of the cryptographic circuitry, a constant associated with the second branch, using, as an encryption key, a key of the one or more unique keys that is associated with the second branch, generating a first output of the second branch; XORing the first output of the first branch, the first output of the second branch, and a first portion of plaintext data, generating a first portion of cypher text; encrypting, using the first branch of the cryptographic circuitry, the first output of the first branch, using, as an encryption key, the key of the one or more unique keys that is associated with the first branch, generating a second output of the first branch; encrypting, using the second branch of the cryptographic circuitry, the first output of the second branch, using, as an encryption key, the key of the one or more unique keys that is associated with the second branch, generating a second output of the second branch; and XORing the second output of the first branch, the second output of the second branch and a second portion of plaintext data, generating a second portion of cypher text. In an embodiment, the contents comprise instructions executed by the cryptographic circuitry. In an embodiment, the XORing the first output of the first branch, the first output of the second branch, and the first portion of plaintext data comprises: XORing the first output of the first branch with the first output of the second branch, generating a first XOR result; and XORing the first XOR result with the first portion of plaintext data, generating the first portion of cypher text; and the XORing the second output of the first branch, the second output of the second branch, and the second portion of plaintext data comprises: XORing the second output of the first branch with the second output of the second branch, generating a second XOR result; and XORing the second XOR result with the second portion of plaintext data, generating the second portion of cypher text.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
executing cryptographic operations on data using cryptographic circuitry; and
protecting, using the cryptographic circuitry, the cryptographic operations during the executing, the executing and protecting including:
generating an initialization vector;
generating, using the initialization vector and a secret key, one or more unique keys;
encrypting, using a first branch of the cryptographic circuitry, a constant associated with the first branch, using, as an encryption key, a key of the one or more unique keys that is associated with the first branch, generating a first output of the first branch;
encrypting, using a second branch of the cryptographic circuitry, a constant associated with the second branch, using, as an encryption key, a key of the one or more unique keys that is associated with the second branch, generating a first output of the second branch;
XORing the first output of the first branch, the first output of the second branch, and a first portion of plaintext data, generating a first portion of cypher text;
encrypting, using the first branch of the cryptographic circuitry, the first output of the first branch, using, as an encryption key, the key of the one or more unique keys that is associated with the first branch, generating a second output of the first branch;
encrypting, using the second branch of the cryptographic circuitry, the first output of the second branch, using, as an encryption key, the key of the one or more unique keys that is associated with the second branch, generating a second output of the second branch; and
XORing the second output of the first branch, the second output of the second branch and a second portion of plaintext data, generating a second portion of cypher text, wherein:
the XORing the first output of the first branch, the first output of the second branch, and the first portion of plaintext data comprises:
XORing the first output of the first branch with the first output of the second branch, generating a first XOR result; and
XORing the first XOR result with the first portion of plaintext data, generating the first portion of cypher text; and
the XORing the second output of the first branch, the second output of the second branch, and the second portion of plaintext data comprises:
XORing the second output of the first branch with the second output of the second branch, generating a second XOR result; and
XORing the second XOR result with the second portion of plaintext data, generating the second portion of cypher text.

2. The method according to claim 1, wherein,
the one or more unique keys comprise a single unique key associated with both the first branch and the second branch; and
the constant associated with the first branch and the constant associated with the second branch are different constants.

3. The method according to claim 1, wherein,
the one or more unique keys comprise a first unique key associated with the first branch and a second, different unique key associated with the second branch; and
the constant associated with the first branch and the constant associated with the second branch are equal.

4. The method according to claim 1, comprising generating the initialization vector as a nonce.

5. The method according to claim 1, comprising executing an authentication procedure on the first and second portions of cipher text.

6. The method according to claim 1, wherein the encrypting by the first and second branches comprises applying AES ciphering.

7. The method according to claim 1, wherein the generating, using the initialization vector and a secret key, the one or more unique keys comprises:

performing a leakage resilient key derivation function using a master encryption key and the initialization vector (IV) as inputs to a key derivation function chain.

8. A cryptographic device, comprising:
a first encryption branch comprising a plurality of cryptographic circuits coupled together in series;
a second encryption branch comprising a plurality of cryptographic circuits coupled together in series; and
XOR circuitry coupled to the first encryption branch and to the second encryption branch, wherein, the cryptographic device, in operation, executes cryptographic operations on data and protects the cryptographic operations during the executing, the executing and protecting including:
encrypting, using the first branch of the cryptographic circuitry and an encryption key associated with the first branch, a constant associated with the first branch, generating a first output of the first branch;
encrypting, using the second branch of the cryptographic circuitry and an encryption key associated with the second branch, a constant associated with the second branch, generating a first output of the second branch;
XORing, using the XOR circuitry, the first output of the first branch, the first output of the second branch, and a first portion of plaintext data, generating a first portion of cypher text;
encrypting, using the first branch of the cryptographic circuitry and the encryption key associated with the first branch, the first output of the first branch, generating a second output of the first branch;
encrypting, using the second branch of the cryptographic circuitry and the encryption key associated with the second branch, the first output of the second branch, generating a second output of the second branch; and
XORing, using the XOR circuitry, the second output of the first branch, the second output of the second branch, and a second portion of plaintext data, generating a second portion of cypher text, wherein the XOR circuitry, in operation,
XORs the first output of the first branch with the first output of the second branch, generating a first XOR result;
XORs the first XOR result with the first portion of plaintext data, generating the first portion of cypher text;
XORs the second output of the first branch with the second output of the second branch, generating a second XOR result; and
XORs the second XOR result with the second portion of plaintext data, generating the second portion of cypher text.

9. The cryptographic device according to claim 8, wherein,
the encryption key associated with the first branch and the encryption key associated with the second branch are a same encryption key; and
the constant associated with the first branch and the constant associated with the second branch are different constants.

10. The cryptographic device according to claim 8, wherein,
the encryption key associated with the first branch and the encryption key associated with the second branch are different encryption keys; and the constant associated with the first branch and the constant associated with the second branch are a same constant.

11. The cryptographic device of claim 8, comprising a key generator coupled to the first and second encryption branches, wherein the key generator, in operation, generates one or more unique keys based on an initialization vector and a master key.

12. The cryptographic device of claim 11, wherein the key generator comprises a leakage resilient key derivation function chain having a plurality of AES circuits coupled together in series.

13. The cryptographic device of claim 11, comprising a random number generator, which, in operation, generates the initialization vector.

14. The cryptographic device of claim 11, comprising a monotonic counter, which, in operation, generates the initialization vector.

15. The cryptographic device of claim 8, wherein the cryptographic device, in operation, executes an authentication procedure on the first and second portions of cipher text.

16. The cryptographic device of claim 8, wherein,
the plurality of cryptographic circuits of the first encryption branch comprise a plurality of AES circuits coupled together in series; and
the plurality of cryptographic circuits of the second encryption branch comprise a plurality of AES circuits coupled together in series.

17. A system, comprising:
processing circuitry; and
memory coupled to the processing circuitry, wherein the processing circuitry, in operation:
encrypts, using an encryption key associated with a first encryption branch, a constant associated with the first encryption branch, generating a first output of the first encryption branch;
encrypts, using an encryption key associated with a second encryption branch, a constant associated with the second encryption branch, generating a first output of the second encryption branch;
XORs the first output of the first encryption branch, the first output of the second encryption branch, and a first portion of plaintext data, generating a first portion of cypher text;
encrypts, using the encryption key associated with the first encryption branch, the first output of the first encryption branch, generating a second output of the first encryption branch;
encrypts, using the encryption key associated with the second encryption branch, the first output of the second encryption branch, generating a second output of the second encryption branch; and
XORs the second output of the first encryption branch, the second output of the second encryption branch, and a second portion of plaintext data, generating a second portion of cypher text, wherein the processing circuitry, in operation,
XORs the first output of the first encryption branch with the first output of the second encryption branch, generating a first XOR result;
XORs the first XOR result with the first portion of plaintext data, generating the first portion of cypher text;
XORs the second output of the first encryption branch with the second output of the second encryption branch, generating a second XOR result; and XORs the second XOR result with the second portion of plaintext data, generating the second portion of cypher text.

18. The system according to claim 17, wherein, the encryption key associated with the first encryption branch and the encryption key associated with the second encryption branch are a same encryption key; and the constant associated with the first encryption branch and the constant associated with the second encryption branch are different constants.

19. The system of claim 17, wherein, the encryption key associated with the first branch and the encryption key associated with the second branch are different encryption keys; and the constant associated with the first branch and the constant associated with the second branch are a same constant.

20. A non-transitory computer-readable medium having contents which cause cryptographic circuitry to perform a method, the method comprising:

executing cryptographic operations on data; and protecting the cryptographic operations during the executing, the executing and protecting including:

generating an initialization vector;

generating, using the initialization vector and a secret key, one or more unique keys;

encrypting, using a first branch of the cryptographic circuitry, a constant associated with the first branch, using, as an encryption key, a key of the one or more unique keys that is associated with the first branch, generating a first output of the first branch;

encrypting, using a second branch of the cryptographic circuitry, a constant associated with the second branch, using, as an encryption key, a key of the one or more unique keys that is associated with the second branch, generating a first output of the second branch;

XORing the first output of the first branch, the first output of the second branch, and a first portion of plaintext data, generating a first portion of cypher text;

encrypting, using the first branch of the cryptographic circuitry, the first output of the first branch, using, as an encryption key, the key of the one or more unique keys that is associated with the first branch, generating a second output of the first branch;

encrypting, using the second branch of the cryptographic circuitry, the first output of the second branch, using, as an encryption key, the key of the one or more unique keys that is associated with the second branch, generating a second output of the second branch; and XORing the second output of the first branch, the second output of the second branch and a second portion of plaintext data, generating a second portion of cypher text, wherein, the XORing the first output of the first branch, the first output of the second branch, and the first portion of plaintext data comprises:

XORing the first output of the first branch with the first output of the second branch, generating a first XOR result; and XORing the first XOR result with the first portion of plaintext data, generating the first portion of cypher text; and the XORing the second output of the first branch, the second output of the second branch, and the second portion of plaintext data comprises:

XORing the second output of the first branch with the second output of the second branch, generating a second XOR result; and XORing the second XOR result with the second portion of plaintext data, generating the second portion of cypher text.

21. The non-transitory computer-readable medium of claim 20, wherein the contents comprise instructions executed by the cryptographic circuitry.

* * * * *